United States Patent [19]

Block et al.

[11] 4,389,319
[45] Jun. 21, 1983

[54] HIGH TEMPERATURE STABLE VISCOSIFIER AND FLUID LOSS CONTROL SYSTEM

[75] Inventors: Jacob Block, Rockville; Peter C. Green, Ellicott City, both of Md.

[73] Assignee: W. R. Grace & Co., New York, N.Y.

[21] Appl. No.: 257,460

[22] Filed: Apr. 24, 1981

[51] Int. Cl.$^3$ .............................................. C09K 7/02
[52] U.S. Cl. ............................ 252/8.5 A; 252/8.5 C
[58] Field of Search ............. 252/8.5 A, 8.5 B, 8.5 C, 252/8.55 R; 525/61

[56] References Cited

U.S. PATENT DOCUMENTS

| | | | |
|---|---|---|---|
| 3,072,635 | 1/1963 | Menkart et al. | 536/87 X |
| 3,475,334 | 10/1969 | Boudreaux | 252/8.55 |
| 3,847,638 | 11/1974 | Suman et al. | 252/8.55 X |
| 4,045,357 | 8/1977 | Reed | 252/8.5 |
| 4,059,533 | 11/1977 | Watson et al. | 252/8.5 |
| 4,234,433 | 11/1980 | Rhudy et al. | 252/8.55 |
| 4,240,915 | 12/1980 | Block | 252/8.5 |
| 4,349,443 | 9/1982 | Block | 252/8.5 |

FOREIGN PATENT DOCUMENTS 356408  9/1931  United Kingdom ................. 525/61

*Primary Examiner*—Herbert B. Guynn
*Attorney, Agent, or Firm*—Howard J. Troffkin

[57] ABSTRACT

The present invention is directed to a high temperature stable composition capable of imparting a combination of pseudoplasticity and fluid loss control properties to aqueous systems. The composition is a combination of:
  (a) a hydroxy containing aluminum component
  (b) a chemical compound capable of converting to a higher oxidation state under alkaline conditions; and
  (c) a reaction product of a polymeric substance selected from polyvinyl alcohol or hydroxyalkyl cellulose reacted with at least 1 percent of stoichiometry of a cross-linking agent selected from an epihalohydrin or an aldehyde containing or generating agent;

wherein the amount of component (a) is at least 75 wt. percent of component (c) and component (b) is at least 25 wt. percent of component (c).

The invention is further directed to improved drilling fluids containing said composition and to the process of drilling bore holes using said improved fluid.

7 Claims, No Drawings

HIGH TEMPERATURE STABLE VISCOSIFIER AND FLUID LOSS CONTROL SYSTEM

BACKGROUND OF THE INVENTION

The present invention relates to a composition which is capable of imparting a high degree of non-Newtonian, pseudoplasticity and fluid loss controlling properties to aqueous systems and which is stable to elevated temperature conditions. More particularly, the present invention relates to the formation of an improved water-based, clay-free drilling fluid containing the subject composition and to an improved method of drilling bore holes into subterranean formations using said drilling fluid.

In normal well drilling operations in which a well is drilled by a rotary method, the well bore hole is generally filled with a drilling fluid or mud which is circulated therein. Drilling fluids are usually pumped down through the drill stem of the rotary rig, circulated around the drill bit and returned to the surface through the annular passage between the drill stem and well wall. These drilling fluids perform a number of functions including lubricating the drill stem and bit, cooling the bit, carrying the cuttings from the bit up the bore hole to the surface where the cuttings may be separated and disposed of, and providing a hydrostatic head against the walls of the well to contain downhole geopressure.

A primary requisite of a satisfactory drilling fluid is its ability to readily circulate and flow, that is, to have low viscosity, under the high shear conditions which are present in the environs of the drill bit while, at the same time, being capable of having and maintaining sufficient viscosity to be capable of efficiently carrying the bit cuttings to the surface and maintaining in suspension, any other solid components of the drilling fluid.

The drilling fluid must also be capable of inhibiting the amount of fluid, normally water, which is lost into the porous strata through which the bore hole traverses. The loss of fluid causes the formation and build-up of a cake deposit which, after a period of time, can cause sticking of the drill pipe and stoppage of the drilling operation. The drilling fluid must, therefore, be of a nature which permits minimum loss into the porous strata. Agents which impart such property are conventionally termed "water loss controllers" or "fluid loss controllers".

The drilling fluid must also be stable and functional after subjection to elevated temperature conditions. In addition to the heat generated by the frictional forces of the drill bit, it is well known that the temperatures encountered in the bore hole are substantially above that found at the earth's surface. The deeper the bore hole is, the higher the temperature encountered. Drilling to greater depths has become common in today's quest for discovering new reserves. A general rule of thumb indicates that for each 10° to 20° F. increase in temperature stability one can use the same fluid to drill an additional 1000 ft. It is, therefore, desired to produce a composition capable of exhibiting stability and desired functionality at the elevated temperatures commonly encountered in deep drilling operations.

It is a widely held and accepted theory that the viscosities suitable for creating a particle carrying capacity in the fluid can be achieved with the drilling fluid having pseudoplastic properties. For example, the drilling fluid must be capable of having a low viscosity under the high shear rates such as encountered at the drill bit, yet have the ability to increase in viscosity (and, therefore, particle holding power) under decreasing shear rates encountered in its upward movement through the annulus.

In order to obtain the requisite pseudoplastic properties, it has been thought desirable to use clay or colloidal clay bodies such as sodium bentonite. As a result, the drilling fluids have been usually referred to as "muds". The clay-based drilling fluids are, however, highly unstable when they come in contact with various salts found in drilled earth formations.

Materials which have come into expanding use to impart rheological properties to drilling compositions are xanthan gums such as are described in U.S. Pat. Nos. 3,198,268; 3,208,526; 3,251,147; 3,243,000; 3,307,016; 3,319,715 and 3,988,246. These materials have been found to cause aqueous solutions, such as drilling fluids, to exhibit pseudoplastic properties under varying low shear rates. However, these materials, whether used alone or in combination with other additives, present the problem of being irreversibly degraded by the elevated temperatures often encountered during conventional drilling operations.

Prior utilization of hydroxides or hydrated metal oxides of amphoteric metals in well treating fluids have involved properties distinctly different from the properties required for a drilling fluid as described herein. For example, U.S. Pat. Nos. 3,614,985 and 3,815,681 describe a process for plugging a subterranean reservoir by permeating its pores with a solution containing an amphoteric metal salt and a pH increasing reactant to cause precipitation in the pores. U.S. Pat. No. 3,603,399 describes a process for treating a water sensitive formation by permeating its pores with a hydroxy-aluminum solution which is a clear and relatively non-viscous solution. In each of such prior well treating processes, it has been important that the solution have relatively low viscosity and high fluid loss to ensure that the solution penetrates into the matrix or pores of the reservoir. Such fluids would not be suitable as a drilling mud. U.S. Pat. No. 3,860,070 describes a well completion or fracturing fluid containing an amphoteric metal salt and a base in a ratio to make the final solution strongly acidic in order to form a thickened fluid suitable as a fracturing fluid. Such fluids cannot be used satisfactorily in a drilling operation due to their corrosive nature with respect to the metal drilling equipment.

The viscosity of a drilling fluid has been relied upon as a mode of aiding in fluid loss control with little success especially when drilling into and through porous substrates. Various agents have been added to enhance the fluid loss properties of the mud. For example, U.S. Pat. No. 3,032,498 describes a cyanoethylated starch as a water loss controller to be used in combination with a clay-based mud. U.S. Pat. Nos. 3,988,246 describes an esterified or etherified starch as a water loss controlling agent which is compatible with a xanthan gum based drilling mud. Other agents as well as the starches mentioned above which have been employed in clay free muds to control fluid loss are generally found to be unstable to the temperature conditions encountered in deep well drilling.

There is a general need for a composition which is capable of imparting both pseudoplastic and water loss controlling properties to aqueous compositions while being stable to varying conditions and elevated temper-

SUMMARY OF THE INVENTION

The present invention is directed to a high temperature stable composition capable of imparting a high degree of pseudoplasticity and fluid loss control to alkaline aqueous systems. The composition is a combination of:

(a) a hydroxy containing aluminum agent formed by mixing in an aqueous solution and under a high degree of agitation a water soluble basic agent selected from an alkali metal aluminate, alkali metal hydroxide or ammonium hydroxide with a water soluble acidic agent selected from an inorganic acid, or aluminum chloride, sulfate or nitrate such that at least one of said agents is an aluminum containing compound;

(b) a chemical compound capable of converting to a higher oxidation state under alkaline conditions; and (c) a reaction product formed between a polymeric material selected from polyvinyl alcohol or hydroxyalkyl cellulose and a cross-linking agent, the cross-linking agent present at a concentration equivalent to at least about 1 percent of the hydroxyl groups present in the polymer reactant.

The subject combination imparts pseudoplasticity and fluid loss controlling properties to an aqueous system which are unattributable to each of the components and which are stable to elevated temperature and conditions commonly encountered in bore hole drilling operations.

DETAILED DESCRIPTION OF THE INVENTION

The present invention is directed to a composition which is capable of exhibiting stability under high temperature conditions, such as above about 250° F. while imparting a high degree of pseudoplastic and fluid (commonly, water) loss controlling properties to aqueous systems; to the use of such compositions to form an improved water-based, clay-free drilling fluid; and to drilling of bore holes into subterranean formations using said improved drilling fluid.

The subject composition is a combination of a hydroxy containing aluminum agent, a polymeric reaction product and a compound capable of converting to a higher oxidation state. The subject composition shall be described in terms of its use as a component of a drilling fluid.

The hydroxy containing aluminum agents found useful as a component of the composition of the present invention are agents which are substantially water-insoluble, that is, agents which are in suspension or dispersion in aqueous systems. Further, the subject hydroxy containing aluminum agents can be characterized as having an X-ray diffraction spectrum containing a major characterizing diffraction peak at 6.3±0.2 Angstroms or characterized by an X-ray diffraction spectrum as being amorphous, that is, having substantially no X-ray diffraction pattern within the range of from 1.5 to 17 Angstroms. The spectrum is determined by standard techniques using the K-α doublet of copper as the radiation source.

The subject hydroxy containing aluminum agent of the subject invention is formed by contacting certain acidic agents with certain basic agents, as described below, in an aqueous medium under a high degree of agitation. The acidic and basic agents should be used in a ratio such that the resultant product is capable of imparting a pH of at least 8 and preferably from 8 to 10.3 to the water medium in which it is formed.

The basic agents useful in forming the hydroxy-containing aluminum component are water soluble basic materials selected from an alkali metal aluminate, alkali metal hydroxide or ammonium hydroxide or mixtures thereof. Any alkali metal can be used, such as sodium, potassium and the like, with sodium being preferred.

The acidic agent useful in forming the hydroxy-containing aluminum component are water soluble acidic materials selected from an inorganic acid as, for example, hydrochloric, sulfuric or nitric acid and the like, or an aluminum salt selected from aluminum chloride, aluminum nitrate or aluminum sulfate, their hydrates or mixtures of these acidic agents. At least one and preferably both of the acidic and basic agents must be an aluminum containing agent. For example, the hydroxy containing aluminum component may be formed from an alkali metal aluminate, such as sodium aluminate, and aluminum chloride hexahydrate in an aqueous system. The sodium aluminate is mixed with the aluminum chloride hexahydrate in an aqueous phase under high speed mixing. The aluminates which are useful normally will have an alkali metal oxide to aluminum oxide mole ratio of from about 1:1 to 2:1. These materials are commercially available. If desired, solutions of one or both components can be made and then mixed together under high speed mixing to form the hydroxy containing aluminum agent.

The acidic and basic precursor agents can be present in concentrations of from about 5 to 25 percent by weight based on the water present. The concentration can vary above the upper value indicated but should not be such as to inhibit the thorough mixing, preferably under high speed agitation, of the agents during the formation of hydroxy-containing aluminum component. The acidic and basic agents can be mixed using conventional equipment which can generate a high degree of agitation to the aqueous medium. The ratio of acidic and basic component should be such that a final pH of the aqueous medium is at least 8, is preferably from 8 to about 10.3 and more preferably from about 8.3 to 9.7. The resultant aluminum component has hydroxyl groups as an integral part of its composition.

The polymeric component of the subject composition is formed by contacting a polymeric material selected from a polyvinyl alcohol or a hydroxyalkyl cellulose, as fully described herein below, with a crosslinking agent selected from an aldehyde containing or generating agent or an epihalohydrin.

The polyvinyl alcohol reaction product found useful in forming the subject inventive composition is formed by contacting polyvinyl alcohol and an aldehyde containing or generating compound. The polyvinyl alcohols found useful in forming the subject reaction product have a weight average molecular weight of at least about 20,000 and preferably the weight average molecular weight should be from about 90,000 to 200,000. Conventionally polyvinyl alcohol is the hydrolyzed product of polyvinyl acetate. The hydrolysis should be at least about 75 percent complete and preferably from about 80 to 95 percent complete to form a suitable polyvinyl alcohol reactant. The polyvinyl alcohol reactant, such as formed from the hydrolysis of polyvinyl acetate or the like, can be reacted in an aqueous medium with an aldehyde containing or generating reactant. Suitable aldehyde containing reactants include, for example, formaldehyde, acetaldehyde, propionaldehyde, glycolaldehyde, glyoxylic acid and the like or polyaldehydes such as glyoxal, glutaraldehyde, paraformaldehyde and the like. Other suitable aldehyde reactants include aldehyde generating agents such as melamine-formaldehyde monomeric products and derivatives such as tri and hexa(methylol)melamine and the tri and hexa($C_1$–$C_3$ alkoxymethyl)melamine. Such materials can be formed by known conventional methods. The alkyl blocked derivatives are commercially available, are stable to self polymerization and are, therefore, preferred. Of all of the aldehyde reactants, the preferred reactants are paraformaldehyde and formaldehyde.

The cross-linking agent found suitable in forming the subject cross-linked polyvinyl alcohol component can also be an epihalohydrin. The halo group can be chlorine, bromine and the like with chlorine being preferred. Further, the epihalohydrin can be substituted with a $C_1$–$C_3$ alkyl group such as methyl, ethyl, or propyl. The most preferred epihalohydrin cross-linking agent is epichlorohydrin due to its availability and superior product formed.

The subject polyvinyl alcohol reaction product found suitable in the subject composition to impart the combined desired properties can be formed by reacting a polyvinyl alcohol, as described above, with from at least about 1 and preferably from about 1 to 200 and most preferably 2 to 50 percent of stoichiometry of at least one of the above described cross-linking reactants based on the hydroxyl contant of the polyvinyl alcohol. We define stoichiometry as the reaction of 2 OH groups with one aldehyde or epi group. Excess cross-linking reactant can be used. The particular quantity of reactant will depend upon the solubility of the reactant in the aqueous reaction media, its reactivity and the like properties as is conventional to those skilled in this art. The reaction product should be dispersible in water. The reaction to form the polyvinyl alcohol-aldehyde reaction product can be carried out in an aqueous medium which should be acidic, that is, have a pH of 5.5 or less and preferably from 1 to 4.5 and which may contain other components, such as alkali metal sulfates in from 1% to saturation, to aid in the formation of the polymer product. The reaction can be carried out at ambient or elevated temperatures, such as from about 50° C. to 100° C. The solid product can be recovered by conventional techniques such as by salting out the product using suitable salts as, for example, sulfate, carbonate or phosphate salts, decantation, filtration and drying.

The hydroxyalkyl cellulose reaction product found useful in forming the subject inventive composition is formed by contacting a hydroxyalkyl cellulose with a cross-linking agent as described below. The hydroxyalkyl cellulose can have a $C_1$–$C_3$ alkyl group and, therefore, be hydroxymethyl, hydroxyethyl, hydroxy-n-propyl or hydroxyisopropyl cellulose. These materials are commercially available. The preferred material is hydroxyethyl cellulose. It is well known that unmodified cellulose chains are composed of repeating anhydroglucose rings, each of which has three hydroxy groups. To form hydroxyethyl cellulose, for example, the cellulose is conventionally treated with an alkali hydroxide and then reacted with ethylene oxide by known manners. The hydroxyalkyl cellulose can have a weight average molecular weight of at least about 20,000 and preferably at least 60,000 with from 60,000 to 150,000 being most preferred.

The cross-linked hydroxyalkyl cellulose suitable in the present invention can be formed by reacting hydroxyalkyl cellulose with a cross-linking agent selected from an aldehyde or aldehyde generating agent or an epihalohydrin. Suitable aldehyde containing reactants or aldehyde generating agents or epihalohydrins are those agents described herein above as reactants with polyvinyl alcohol.

The subject cross-linked hydroxyalkyl cellulose can be formed by reacting a hydroxyalkyl cellulose, as described above, with from at least about 1 and preferably from about 1 to 200 and most preferably 2 to 50 percent of stoichiometry of a cross-linking reactant. Stoichiometry is based on all three available hydroxyl groups of the anhydroglucose rings forming the hydroxyalkyl cellulose.

The formation of the cross-linked hydroxyalkyl cellulose with an aldehyde is carried out in an aqueous acidic medium which has a pH of 5.5 or less and preferably from 1 to 4.5. The reaction can be carried out at ambient or elevated temperatures, such as from about 50° C. to 100° C. The solid product can be recovered by conventional techniques of precipitation by salts or alcohol, filtration and drying.

The formation of the cross-linked hydroxyalkyl cellulose and the cross-linked polyvinyl alcohol with an epihalohydrin should be carried out in a basic aqueous medium which has a pH of at least about 9.5. The reaction can be carried out at ambient or elevated temperatures, such as from about 50° C. to 100° C. The product is recovered by conventional techniques of precipitation by salts of alcohol, filtration and drying.

The present invention further requires the use of a compound capable of converting from a lower to a higher oxidation state. The ability of the compound to make such a conversion is not meant to limit the invention to the requirement that the subject compound undergoes such conversion or that the agent, per se, is merely the precursor for the product required in the subject composition. The compound can be organic or inorganic and of momomeric, low molecular weight. Organic compounds which are suitable include alkanols, preferably lower alkanols, as, for example, methanol, ethanol, n-propanol, iso-propanol, butanols and pentanols and the like; phenols such as phenol, $C_1$–$C_3$ alkyl, aryl and alkaryl substituted phenols, tert-butyl-catechol and hydroquinone and the like; mercaptans such as $C_1$–$C_{15}$ alkanethiols and the like. In addition the agent can be an inorganic readily oxidizable substance such as an alkali metal or alkaline earth metal or ammonium salt of sulfite, bisulfite, thiosulfate, hydrosulfite or nitrite; ferrous or cuprous metal salts of chloride, sulfate and alkali metal borohydrides and the like and their equivalence. The preferred materials are water soluble $C_1$–$C_5$ alkanols, sulfite salts, bisulfite salts and nitrite salts of an alkali or alkaline earth metal or ammonium.

The components of the subject composition should be present in effective amounts such that, in combination, they are capable of exhibiting a high degree of pseudoplasticity and fluid loss controlling properties. Normally the combined properties are attained by using the above described hydroxy containing aluminum agent and polymeric reaction product in amounts such that their weight ratio is at least 0.75 to 1 with ratio of from 0.75:1 to 3:1 being preferred and 1:1 to 3:1 being most preferred. The chemical compound capable of converting to a higher oxidation state described herein above should be used in amounts such that the ratio of the chemical compound to polymeric reaction product is at least 0.2:1 with, preferably, a ratio of 0.2:1 to 1:1 and most preferably a ratio of at least 0.25:1 to 0.75:1.

Compositions having the combination of the above described components have unexpectedly been found to exhibit the desired combination of properties of pseudoplasticity and fluid-loss control which are unattainable by separate use of the materials. Further, the composition is capable of maintaining these properties under elevated temperatures found in deep bore hole drilling such as greater than 250° F. (121° C.) and generally are stable at temperatures of 300° F. (149° C.) and greater.

Amphoteric metal hydroxides formed in various manners and from various material are known to form a gelatinous mass in aqueous systems. Aqueous amphoteric metal hydroxide gels have been found useful for various purposes, such as coatings, adhesives and the like as well as in specific well treating compositions, such as fracturing or completion fluids. Such gels and compositions are used under conditions distinctly different than presently required and do not exhibit water-loss controlling properties. Although hydroxy-containing aluminum agents disclosed herein have been unexpectedly found capable, when used alone, of imparting a certain degree of pseudoplasticity to aqueous systems, they do not impart fluid loss control to aqueous systems.

The presently described polymeric reaction products do not, when used alone, exhibit and impart fluid loss control or pseudoplasticity as described herein above to aqueous systems such as water-based clay-free drilling fluids.

The aqueous system which contains the subject composition should have an alkaline pH of at least 8 and preferably from 8 to 12 and more preferably of from 8.3 to 10.3. At these alkaline pH conditions, one attains the desired properties. Adjustment of the pH can be done with any water soluble inorganic base or acid such as alkali metal hydroxide, alkaline earth metal hydroxide or a hydrohalic acid, sulfuric acid, nitric acid, sodium bicarbonate, or sodium carbonate.

The aqueous system should be mixed to the extent required to cause the components of the composition to be substantially uniformly distributed therein. Further, the hydroxy aluminum containing aqueous medium or preferably the resultant composition containing system may have the combined described pseudoplastic and fluid loss control properties further enhanced by subjecting the system to mixing at high shear rates of about 20,000 sec.$^{-1}$ or greater for short periods of time such as from 5 to 60 minutes as by circulating the aqueous system through a small internal diameter tube at high rate.

The aqueous medium in which the above-described hydroxy-containing aluminum agent is formed can be directly used to form the water-based drilling fluids of the subject invention. The aqueous medium can be diluted with sufficient amount of water to form a system having from about 1 to 15 percent, and preferably from 1.5 to 10 weight percent of the subject composition therein. The concentration most suitable can be readily determined in conventional manners by the mud engineer taking into consideration the concentration and nature of other materials which may also be contained in the drilling fluid.

The above-described composition is capable of imparting to a clay-free, (the term "clay-free" when used herein refers to the absence of drilling fluid viscosifying clays as an essential agent of the fluid and not to other materials entrained therein) aqueous system, such as a water-based drilling fluid (the term "fluid" or "system" when used herein refers to water-based systems containing the subject composition) non-Newtonian, pseudoplasticity, that is to say, that the viscosity of the resultant fluid varies inversely with respect to the shear rate exerted on the fluid. The relationship of the shear stress with respect to shear rate can be defined by the rheological power law model relationship of $$\tau = K(\dot{\gamma})^n$$

in which $\tau$ represents the shear stress exerted on the aqueous system of the drilling fluid in units such as pounds per 100 ft$^2$ or dynes/cm$^2$; $\dot{\gamma}$ is the shear rate in units of reciprocal time such as sec$^{-1}$; K is a constant having the value of the shear stress of the particular aqueous system at a shear rate of 1 sec$^{-1}$; and n is a numerical value greater than zero. When n=1, the system is Newtonian; if n is less than 1, the system is pseudoplastic, and if n is greater than 1, the system is dilatant. It has been unexpectedly found that fluids containing the presently described composition exhibit shear stress ($\tau$) properties at varying shear rates ($\dot{\gamma}$) in the range of from about 10 to 400 sec$^{-1}$, that is, in the range normally encountered in the annular region of the bore hole such that n of the power law relationship has a value of less than about 0.4. Such systems, therefore, exhibit non-Newtonian, pseudoplastic properties to an exceptionally high and desirable degree.

The above-described composition has been unexpectedly found to exhibit a high degree of fluid loss control. That is to say that the fluid is capable of interacting with the adjacent porosity to inhibit loss of the fluid to the porous environment. The fluid loss of the system can be determined in accordance with the American Petroleum Institute's procedure API No RP-13B. After initial spurt, the desired water loss control normally attained with the subject composition is of less than about 20 ml per 30 minutes.

The drilling fluids containing the subject composition have unexpectedly been found to have high degrees of stability with respect to their rheological and fluid loss properties under various adverse conditions. Such fluids have been found to be stable after subjection to elevated temperatures for sustained periods of time, to high shear rates such as are encountered at the site of the drill bit, as well as being stable in the presence of various corrosive elements such as calcium chloride, and sodium chloride which may be entrained in such fluids.

The high degree and breadth of stability of the presently achieved drilling fluid, when combined with its ability to exhibit non-Newtonian, pseudoplastic properties under varying low shear rates of from about 10 to 400 sec$^{-1}$ and greater, such as are encountered in the annular region between the drill stem and the casing of the bore hole, aids in increasing the drilling efficiency, that is, the rate of drilling the bore hole.

The drilling fluid composition of the subject invention can contain other conventional drilling fluid additives such as weighting agents as, for example, crushed oyster shells, barite and the like; thinner such as ferrochrome lignosulfonate and the like; lost-circulation agents such as ground walnut shells, cotton seed hulls and the like; pH adjusters such as MgO, sodium carbonate, sodium bicarbonate and the like; as well as other conventional additives.

The terms "water-based" or "aqueous-based" which are used herein in describing the present invention, generally includes drilling fluids which have a liquid base comprising substantially fresh water or salt water. However, it is to be realized that at times certain small amounts of other liquids may be emulsified or admixed with the water-based fluid. For example, drilling fluids may at times contain small amounts of oil, emulsified or admixed with the drilling fluid, the oil coming either from an oil bearing formation which has been drilled into or, under certain conditions, from purposeful addition.

The present water-based, clay-free drilling fluids containing the subject composition have been found to be stable to elevated temperatures such as greater than 250° F. to about 350° F. encountered in deep well drilling, the presence of calcium and sodium salts and to the presence of conventional drilling fluid additives. Other viscosifiers and water loss controllers need not be present. Further, the present drilling fluids are substantially non-corrosive and non-destructive to metal equipment commonly used in drilling operations.

The subject composition can be used with conventional bore hole drilling equipment in manners known to those skilled in the art to efficiently and effectively drill bore holes into subterranean formations. The pseudoplastic and fluid loss control properties of drilling fluids containing said composition permit effective removal of the cuttings from the area at and around the drill bit to permit more efficient drilling of the formation when circulating the fluid during bore hole drilling.

The following examples are given for illustrative purposes only, and are not meant to be a limitation on the subject invention except as indicated by the appended claims. All parts and percentages are by weight unless otherwise indicated. The units of K of the power law is lb-sec/100 ft$^2$.

EXAMPLE I

Formation of Cross-Linked Hydroxyethyl Cellulose

A. A 40 percent aqueous solution of glyoxal was added with stirring to a 5 percent solution of a commercially obtained hydroxyethyl cellulose (MS equals 2.5; Brookfield viscosity of a 5 percent aqueous solution equals 150 centipoise) (Natrosol 250L). The weight ratio of glyoxal to hydroxyethyl cellulose was 21 to 100. The pH of the aqueous system was adjusted to 3.5 with 1 N HCl and the system was heated to 60°–70° C. for 30 minutes with stirring. The resultant aqueous suspension of cross-linked hydroxyethyl cellulose was adjusted to pH 9.5 with 10 percent NaOH solution.

B. A cross-linked hydroxyethyl cellulose was made in the same manner as in Part A above, except that paraformaldehyde was used instead of glyoxal. The weight ratio of paraformaldehyde to HEC was 13.5 to 100.

C. A cross-linked hydroxyethyl cellulose was prepared by adding 5.1 parts epichlorohydrin and 4.4 parts sodium hydroxide to 200 parts of a 5 percent aqueous solution of hydroxyethyl cellulose, as described above. The solution was heated to 80° C. and maintained at that temperature for 1 hour under continuous agitation. The material was cooled to form the aqueous suspension of cross-linked hydroxyethyl cellulose.

Formation of Polyvinyl Alcohol/Aldehyde Product 200 parts of a commercially obtained polyvinyl alcohol having weight average molecular weight of 125,000 and 87% hydrolyzed (Gelvatol 20–90) were dispersed in 600 parts of a 16 percent $Na_2SO_4$ aqueous solution. The solution was then adjusted to pH of 3.0 with HCl. The mixture was heated to 50° C. with stirring. 68 parts of paraformaldehyde were added and then the temperature was raised and maintained for 30 minutes at the temperature of 60° C. while maintaining slow stirring. The mixture was cooled and adjusted to pH of 9.5 with NaOH. The resultant product was filtered air dried and then dried at 50° C. under vacuum for 16 hours.

Formation of Hydroxy-Containing Aluminum Agent 15.3 parts of commercially obtained sodium aluminate ($Na_2O \cdot Al_2O_3 \cdot 3H_2O$) powder was mixed with 12.2 parts of commercially obtained aluminum chloride hexahydrate powder. The mixture was added to 350 parts water and subjected to high speed mixing using a Hamilton Beach Model 936-2 mixer for 20 minutes. The aqueous dispersion was allowed to sit for 18 hours and then again subjected to high speed mixing for 5 minutes. The pH of the resultant dispersion was 8.5 and was adjusted to 9.6 with dilute NaOH.

The hydroxy-containing aluminum agent concentrations will be determined herein below based on the formula A10(OH) although the subject agent may be present in other forms.

EXAMPLE II

For comparative purposes, aqueous samples of hydroxy-containing aluminum and of each of the polymeric reaction products, respectively, were tested for rheology and fluid loss control.

An aqueous system having 3 percent of the hydroxy-containing aluminum product prepared according to Example I above and having a pH of 9.6 was subjected to rheological analysis using standard procedures with a Haake Rotovisco RV-1 rotating rheometer at varying shear rates of from 8 to 800 sec$^{-1}$ and at 25° C. The values determined for n and K in accordance with the power law model relationship was 0.19 and 2.3, respectively. The fluid loss control of the material was determined using American Petroleum Institute (API) procedure RP 13B at 100 psi and 25° C. A fluid loss value of greater than 150 ml/30 minutes was obtained. The product imparted good pseudoplasticity but substantially no fluid loss control.

The cross-linked hydroxyethyl cellulose product of Example I was diluted with water to form aqueous systems having 1 percent cross-linked hydroxyethyl cellulose therein. The rheology and fluid loss control properties were determined in the same manner and procedures described herein above with respect to the hydroxy-containing aluminum compound. The material was found to be substantially Newtonian (n=1, K=<0.1), and to have a fluid loss of greater than 100 ml/30 minutes. The cross-linked HEC reaction products do not impart pseudoplasticity or fluid loss control to aqueous systems.

The polyvinyl alcohol/paraformaldehyde products of Example I were diluted with water to form aqueous systems having 1.5 percent PVA/A. The rheology and fluid loss control were determined in the same manner and procedures described with respect to the hydroxy-containing aluminum compound herein above. The materials were found to be Newtonian (n=1, K=<0.1), and to have a fluid loss of greater than 200 ml/30 minutes. The PVA/A reaction products do not impart pseudoplasticity nor fluid loss control.

EXAMPLE III

This example illustrates that aqueous systems containing a composition of the hydroxy containing aluminum compound, a polymeric reaction product (PVA/A) and a compound capable of converting to a higher oxidation state forms a system having pseudoplasticity and water loss control even when subjected to high temperature conditions.

An aqueous system was formed by mixing 4 parts of the hydroxy aluminum material (2.4 percent of system) formed in Example I above with 1 part of an 8% dispersion of the polyvinyl alcohol reaction product (1.6 percent of system) formed in Example I above and with 0.025 part methanol (0.5% of system). The pH of the resultant system was adjusted to pH of 9.5. A sample (III-1) of the system was subjected to rheological and fluid loss control properties. The rheological analysis was conducted using standard procedures with a Haake Rotovisco RV-1 rotating rheometer at varying shear rates of from 8 to 800 sec$^{-1}$ and at 25° C. The values of n and K were determined in accordance with the power law model relationship $\tau = K(\dot{\gamma})^n$ in which is in units of lbs/100 ft$^2$; $\dot{\gamma}$ is in sec$^{-1}$; K is in units of lb-sec/100 ft$^2$; and n is a numerical value of from 0 to 1 with values of less than 0.4 indicating good pseudoplastic properties. A second sample (III-2) taken from the formed system was placed in a vessel under $N_2$ atmosphere, sealed and subject to 149° C. (300° F.) for 16 hours while under constant agitation and then allowed to cool to room temperature. The rheology and fluid loss control of the heat treated composition were determined by the above referenced procedure. Finally, a third sample (III-3) of the composition was subjected to elevated temperature (300° F./16 hours) and was then subjected to high shear forces by circulating the sample composition through a capillary tube (I.D.=0.0314 inch) for 30 minutes to give an approximate calculated shear rate of 25,000 sec$^{-1}$. The fluid loss control was determined according to API procedure RP 13B and recorded as corrected fluid loss (CFL in ml/30 min. The corrected fluid loss is obtained by substracting the spurt value from the total fluid loss volume. The corrected fluid loss value is the rate of loss the fluid would be expected to exhibit over an extended period. The rheology and fluid loss control of this sample were determined. A summary of the results are contained in Table I below.

TABLE I

| Sample | n | K | CFL |
|--------|------|------|------|
| III-1  | 0.23 | 8.0  | 7.6  |
| III-2  | 0.18 | 17.0 | 11.0 |
| III-3  | 0.19 | 18.0 | 11.2 |

The results show that the system exhibits good stability with respect to rheology and fluid loss control even after subjected to very high temperature and shear force conditions.

EXAMPLE IV

An aqueous system was formed and tested in the same manner as described in Example III above except that one half part of ground limestone (<200 mesh U.S. Std.) was added and mixed into each of the samples after treatment but prior to testing. The limestone simulates rock cuttings as are encountered by drilling muds in bore hole formation. The results are shown in Table II below:

TABLE II

| Sample | n | K | CFL |
|--------|------|------|------|
| IV-1   | 0.26 | 6.1  | 8.8  |
| IV-2   | 0.19 | 20.0 | 8.5  |
| IV-3   | 0.24 | 22.0 | 8.3  |

The test results clearly indicate that the formed system maintains its rheological and fluid loss control properties and is stable to very elevated temperatures as encountered in deep bore hole drilling operations.

EXAMPLE V

A sample was formed and tested in the same manner as described in Example IV above except that an equivalent weight percent of sodium sulfite was used instead of methanol. The results given in Table III again shows that the subject composition imparts rheology and fluid loss properties which are stable even after subjection to extreme elevated temperatures and shear forces.

TABLE III

| Sample | n | K | CFL |
|--------|------|------|------|
| V-1    | 0.24 | 5.4  | 8.2  |
| V-2    | 0.18 | 20.0 | 8.8  |
| V-3    | 0.22 | 22.0 | 8.2  |

EXAMPLE VI

An aqueous system is formed in the same manner as described in Example III except that the hydroxyethyl cellulose reaction product in Example I is used instead of the polyvinyl alcohol reaction product. Samples of the formed system are tested as described in Example III and show good rheology and fluid loss control properties similar to that attained in Example III above.

EXAMPLE VII

A comparative system was prepared in the same manner as described in Example III above except that no compound (i.e. methanol) capable of converting to a higher oxidation state was included in the formed system. Samples of the system were tested as described in Example III above. The results are given in Table IV below.

TABLE IV

| Sample | n | K | CFL |
|--------|------|------|------|
| VII-1  | 0.20 | 7.4  | 8.2  |
| VII-2  | 0.20 | 10.9 | 410. |
| VII-3  | 0.18 | 12.9 | >200.|

The results clearly show that samples which did not contain a compound capable of converting to a higher oxidation state were unstable and not capable of exhibiting the desired properties after being subjected to an elevated temperature of 300° F.

We claim:
1. A composition capable of imparting to clay-free aqueous systems a combination of pseudoplasticity and fluid loss control comprising a mixture of:
(a) a hydroxy containing aluminum component formed by mixing in an aqueous medium and under a high degree of agitation a water-soluble basic agent selected from the group consisting of an alkali metal aluminate, alkali metal hydroxide, ammonium hydroxide and mixtures thereof with a water-soluble acidic agent selected from an inorganic acid, aluminum chloride, aluminum sulfate, aluminum nitrate, their hydrates and mixtures thereof; at least one of said basic and acidic agents being an aluminum containing compound: said acidic and basic agents being reacted in a ratio such that the resultant product is capable of imparting to an aqueous medium a pH of at least about 8; in combination with (b) a chemical compound capable of converting to a higher oxidation state under alkaline conditions selected from the group consisting of $C_1$–$C_5$ alkanols, unsubstituted or $C_1$–$C_3$ alkyl, aryl or alkaryl substituted phenols, hydroquinone, $C_1$–$C_{15}$ alkanothiol, alkali metal, alkaline earth metal or ammonium salt of sulfite, bisulfite or nitrite, ferrous metal salts of chloride or sulfate and cuprous metal salts of chloride and sulfate; in combination with (c) a reaction product formed between a polymeric material having a weight average molecular weight of at least about 20,000 selected from the group consisting of polyvinyl alcohol and hydroxy $C_1$–$C_3$ alkyl cellulose and at least from about 1 to 200 percent of stoichiometry of a cross-linking agent selected from the group consisting of a compound containing at least one aldehyde group therein or a compound capable of generating in situ at least one aldehyde or an epihalohydrin; the reaction between said polymeric material and said aldehyde carried out in an aqueous acidic medium having a pH of 5.5 or less and the reaction between said polymer and said epihalohydrin being carried out in an aqueous basic medium having a pH of at least about 9.5;

wherein the weight ratio of component (a) to (c) is at least from about 0.75:1 to 3:1 and of component (b) to (c) is at least from about 0.2:1 to 1:1.

2. The composition of claim 1 wherein the aldehyde containing or generating agent of (c) is selected from the group consisting of formaldehyde, acetaldehyde, propionaldehyde, glycolaldehyde, glyoxylic acid, glyoxal, glutaraldehyde, paraformaldehyde, trimethylol melamine, hexamethylol melamine, tri($C_1$–$C_3$ alkoxymethyl) melamine or hexa($C_1$–$C_3$ alkoxymethyl) melamine.

3. The composition of claim 1 wherein the mixture is dispersed in an aqueous medium.

4. The composition of claim 1 wherein component (b) is selected from the group consisting of $C_1$ to $C_5$ alkanols, alkali metal, alkaline earth metal or ammonium salts of sulfite, bisulfite or nitrite or mixtures thereof.

5. The composition of claim 1, wherein the component (c) is formed from polyvinyl alcohol having a weight average molecular weight of from about 90,000 to 200,000 and at least about 75 percent hydrolyzed and the ratio of (a) to (c) is from about 1:1 to 3:1.

6. In a water-based, clay-free drilling fluid suitable for circulating in a bore hole while drilling the bore hole into subterranean formations which includes, water, a weighting agent, a rheology enhancing agent and a fluid-loss controller, the improvement comprising that said rheology enhancing agent and fluid-loss controlling agent are, in combination, the composition of claim 1, 2, 3, 4 or 5 present in said fluid in from about 1 to 15 percent by weight based on the weight of the water present in said fluid and said fluid is maintained at a pH of from about 8 to 11.5.

7. In a process of drilling a bore hole into a subterranean formation using conventional bore hole drilling equipment, the improvement comprising circulating in the bore hole while drilling the drilling fluid of claim 6.

* * * * *